O. M. NACKER.
VALVE OPERATING MECHANISM.
APPLICATION FILED APR. 14, 1917.
1,254,840.
Patented Jan. 29, 1918.
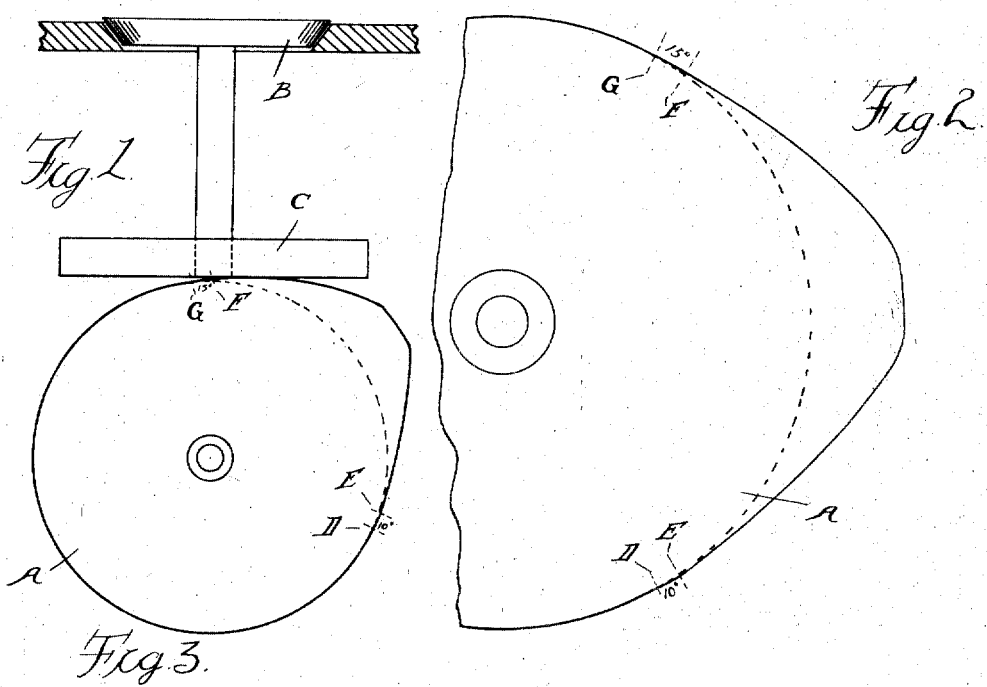
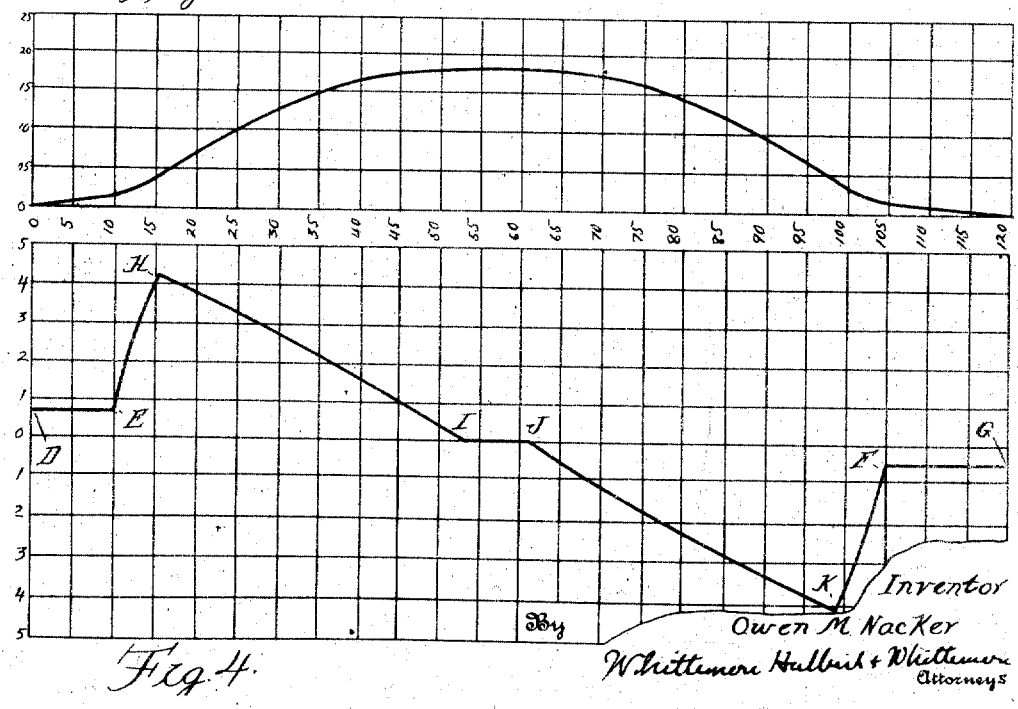

UNITED STATES PATENT OFFICE.

OWEN M. NACKER, OF DETROIT, MICHIGAN, ASSIGNOR OF ONE-HALF TO ALANSON P. BRUSH, OF DETROIT, MICHIGAN.

VALVE-OPERATING MECHANISM.

1,254,840.  Specification of Letters Patent.  Patented Jan. 29, 1918.

Application filed April 14, 1917. Serial No. 162,220.

*To all whom it may concern:*

Be it known that I, OWEN M. NACKER, a citizen of the United States of America, residing at Detroit, in the county of Wayne and State of Michigan, have invented certain new and useful Improvements in Valve-Operating Mechanism, of which the following is a specification, reference being had therein to the accompanying drawings.

The invention relates to valve-operating mechanisms in which puppet-valves are operated by cams and tappets, as is usual in explosion engines. It is the object of the present invention to decrease the noise and at the same time to provide a larger range of clearance between the cam and tappet without objectionable noise than with constructions heretofore used, and to this end the invention comprises the novel construction as hereinafter set forth.

In the drawings:

Figure 1 is a diagrammatic view, showing a puppet-valve and my improved actuating mechanism therefor;

Fig. 2 is an enlarged elevation of the cam, illustrating the principle of its construction;

Fig. 3 is a valve-lift diagram; and

Fig. 4 is a valve-velocity diagram.

In the operation of puppet-valves by the usual cam-actuated mechanism, noise is lessened by reducing the clearance to the minimum. It is, however, impractical to maintain very close adjustments without danger of interfering with the seating of the valve and consequent loss of power in the engine. Furthermore, in the ordinary course of operation the clearance will be increased until readjustment is made.

With an ideal construction, in which all clearance is eliminated, a properly-formed cam will impart to the valve a simple harmonic movement in opening and closing, thereby avoiding any shock or noise. When, however, as is always true under practical conditions, there is a clearance, the point of engagement and disengagement of the cam is where the angle is such as to impart a high velocity to the actuated member and consequently there is both noise and shock. A more gradual angle would avoid this, but the necessity of performing the complete opening and closing within a given angle of rotation of the cam-shaft requires a certain angular lift in the cam.

With the present invention I have avoided the difficulties above described by the peculiar construction of the cam, in which a certain portion for the opening and closing of the valve is at such an angle as to limit the velocity of movement in the actuated member so as to avoid objectionable noise and shocks. This portion is sufficiently extended to provide for the maximum clearance of the tappets, and consequently will operate to limit the velocity in both initial lifting and final seating of the valve.

Various specific designs of cam may be employed, according to the particular conditions under which they operate, but the drawings illustrate one specific construction, in which A represents the cam, B the valve and C the valve lifter. As shown in Fig. 3, the lift of the cam is plotted, the degrees of angular adjustment being upon the horizontal line and the lift of the cam in inches upon the vertical line. It will be observed that in the first ten degrees of angular movement of the cam from its zero position, or from the points D to E, Figs. 1 and 2, the angle is very gradual and will impart only a permissible velocity to the valve. Furthermore, the angle being the same throughout the ten degrees, it will make no difference at what point the clearance or back-lash is taken up, for the initial velocity will be the same. From the ten degree point of angular adjustment the lifting angle is changed to a greater pitch requisite to complete the opening movement in the required time, and a similar steep pitch performs the greater portion of the closing movement. There is, however, a final portion shown as including the last fifteen degrees of movement, or between the points F and G, in which the pitch is greatly reduced and is uniform to the zero point. Thus the velocity of the valve will be checked upon entering this final portion of the movement, so that it is immaterial at what point the seating takes place. A cam constructed as described, when incorporated in a valve-lifting mechanism, has in addition to the advantage of eliminating wear and noise the further advantage of permitting a greater degree of clearance or back-lash in the tappets without detriment.

In the diagram, Fig. 4, the velocity of the valve is plotted, and it will be noted that the velocity is constant from the points D to E and also from the points F to G. From the point E to the point H there is a very rapid acceleration with a more gradual retarding from the point H to the point I, then uniform velocity to the point J, retarding from J to K and rapid acceleration from K to F.

What I claim as my invention is:—

1. The combination with a puppet-valve, of a reciprocating member controlling the movement of said valve, and means for imparting to said member a substantially constant velocity during a portion of its movement where said valve is adjacent to its seat.

2. The combination with a puppet-valve, of a member controlling the reciprocation of said valve and imparting thereto a variable velocity, the velocity of said member during the portion of its movement where said valve is adjacent to its seat being substantially constant.

3. The combination with a puppet-valve, of a cam controlling the reciprocation of said valve, said cam being fashioned to impart to the valve a substantially constant velocity during a predetermined portion of its movement adjacent to its seat.

4. The combination with a puppet-valve, of a rotary cam for controlling the movement of said valve, said cam being fashioned to impart a substantially uniform velocity to the valve during a predetermined angular movement of the cam.

5. The combination with a puppet-valve, of a rotary cam for controlling the movement of said valve, said cam being provided with a portion for effecting the requisite movement of the valve toward and from its seat during a predetermined angular movement of the cam, said portion including a portion where the valve is adjacent to its seat of predeterminedly-limited and substantially-constant velocity, and also a portion of variable velocity.

6. The combination with a puppet-valve of mechanism for opening and closing said valve provided with means for imparting substantially constant velocity to said valve when adjacent to its seat irrespective of variable amounts of back-lash within said mechanism.

7. The combination with a puppet-valve, of mechanism for opening and closing said valve, provided with means for imparting to the valve a predeterminedly-limited, substantially-uniform closing velocity irrespective of variable amounts of back-lash within the actuating mechanism.

8. The combination with a puppet-valve, of mechanism for opening and closing said valve, provided with means for imparting to the valve a predeterminedly-limited, substantially-uniform velocity during its initial opening movement irrespective of variations in the back-lash within said mechanism.

9. The combination with a puppet-valve, of mechanism for opening and closing said valve provided with means for imparting to the valve during initial opening and final closing movements thereof, a predeterminedly-limited and substantially-constant velocity irrespective of variations in back-lash within said mechanism.

In testimony whereof I affix my signature.

OWEN M. NACKER.